US006840101B2

United States Patent
Renninger et al.

(10) Patent No.: US 6,840,101 B2
(45) Date of Patent: Jan. 11, 2005

(54) DEVICE FOR DETERMINING AT LEAST ONE PARAMETER OF A MEDIUM FLOWING IN A LINE

(75) Inventors: Erhard Renninger, Markgroeningen (DE); Thomas Lenzing, Benningen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 09/979,732

(22) PCT Filed: Mar. 29, 2001

(86) PCT No.: PCT/DE01/01192

§ 371 (c)(1),
(2), (4) Date: Mar. 7, 2002

(87) PCT Pub. No.: WO01/75401

PCT Pub. Date: Oct. 11, 2001

(65) Prior Publication Data

US 2002/0104375 A1 Aug. 8, 2002

(30) Foreign Application Priority Data

Mar. 30, 2000 (DE) .......................... 100 15 918

(51) Int. Cl.[7] .................................................. G01F 5/00
(52) U.S. Cl. ............................................. 73/202.5
(58) Field of Search ............................ 73/202, 204.21, 73/202.5, 204.22, 204.11, 861.22, 861.52

(56) References Cited

U.S. PATENT DOCUMENTS

| 5,014,552 | A | * | 5/1991 | Kamiunten et al. | 73/204.21 |
|---|---|---|---|---|---|
| 5,467,648 | A | * | 11/1995 | Igarashi et al. | 73/202.5 |
| 5,696,321 | A | * | 12/1997 | Igarashi et al. | 73/202.5 |
| 6,085,587 | A | * | 7/2000 | Konzelmann | 73/202 |
| 6,240,775 | B1 | * | 6/2001 | Uramachi et al. | 73/204.21 |
| 6,619,114 | B1 | * | 9/2003 | Lenzing et al. | 73/202.5 |
| 6,647,775 | B1 | * | 11/2003 | Hecht et al. | 73/204.21 |

* cited by examiner

*Primary Examiner*—Edward Lefkowitz
*Assistant Examiner*—T Miller
(74) *Attorney, Agent, or Firm*—Robert Bosch GmbH

(57) ABSTRACT

The invention relates to a device for determining at least one parameter of a medium flowing in a line, in particular the intake air mass of an internal combustion engine. The solid particles contained in the line act on a measuring element and influence a characteristic curve behavior of the measuring element, which is used to determine parameters of the flowing medium. In order to reduce the action of solid particles on the measuring element, the measuring element is disposed in a line or a tubular body downstream of a protective screen, and an element for influencing movement paths of the solid particles is disposed in the line, on an inner wall. By intentionally influencing the movement paths of the solid particles, their action on the measuring element is considerably reduced.

20 Claims, 3 Drawing Sheets

DEVICE FOR DETERMINING AT LEAST ONE PARAMETER OF A MEDIUM FLOWING IN A LINE

CROSS-REFERENCE TO RELATED APPLICATIONS

This application is a 35 USC 371 application of PCT/DE 01/01192, filed Mar. 29, 2001.

BACKGROUND OF THE INVENTION

1. Field of the Invention

The invention is based on a device for determining at least one parameter of a medium flowing in a line, and particularly for measuring a parameter of a flow into an internal combustion engine.

2. Description of the Prior Art

DE 197 35 891 A1 has disclosed a measuring body, which can be inserted into a clean conduit of an intake line of an internal combustion engine and is used to determine the mass of intake air; the measuring body has a flow conduit and a measurement conduit, which is essentially inclined in relation to a longitudinal axis of a line and is comprised of an S-shaped deflection conduit adjoining said line. A measuring element is disposed in the measurement conduit. As has been disclosed, for example, by DE 43 38 891 A1 and U.S. Pat. No. 5,452,610, the measuring element can be designed as a micromechanical sensor part with a dielectric membrane. The measuring element can become contaminated by solid particles that penetrate through the air filter and by water permeation through the air filter into the intake line, e.g. as a result of roads that are wet with rain. Natural components of dissolved salts contained in this sprayed water then cause a drift in the characteristic curve due to the buildup of salt encrustation on the membrane of the sensor part.

The inclination of the measuring body does in fact produce a protected leeward region, but a part of these solid particles or fluid particles still get into the measurement conduit.

DE 197 35 664 A1 has already disclosed a device in which the measuring element is disposed inside a tubular body that the medium flows through, where an upstream end of the tubular body extends into a filter chamber and has inlet openings disposed there on a circumferential surface in order to reduce the action of dirt particles or water droplets on the measuring element. Particularly with very dirty air and a high water content in the intake air of the internal combustion engine, there is the danger that the air filter will become saturated with water, which then seeps through the filter mat and entrains dirt particles with it. On the downstream side of the air filter, the actually clean side, there is now the danger that the intake air will once again entrain dirt particles and water droplets from the filter surface, which will then be undesirably deposited on the measuring element and will lead to erroneous measurements or to a failure of the measuring element. The tubular body according to the prior art does reduce the danger of deposits by placing inlet openings on the circumferential surface, but a correspondingly long design of the tubular body produces an undesirable pressure drop, which results in a reduction in measuring sensitivity. In addition, the reduction of an action of fluid/solid particles on the measuring element can hardly be assured with a very high fluid influx of approx. 20 liters/hour.

DE 196 52 753 A1 has disclosed a device with a measuring element, which contains a flow rectifier and a screen in order to stabilize a measurement signal. However, no additional screen or element is used to protect the measuring element from fluids or solid particles.

The use of a deflecting screen in a line has also been proposed for separating fluid particles from a flowing air or gas. A deflecting screen of this kind, which is connected upstream of an inner tube or in the line, influences the air/water mixture flowing toward the measuring element in such a way that the fluid particles are conveyed against a tube wall or a line wall while the air remains in a center of the inner tube.

A different behavior is produced when a mixture of air and dust passes through a deflecting screen in the line. The dust does not form a wall film like a fluid, but is reflected against the line wall, where the principle of the angle of incidence being equal to the angle of reflection applies. Since the measuring element is disposed a certain distance from the deflecting screen, a certain portion of the reflected solid particles collide with the measuring element disposed downstream of the deflecting screen.

SUMMARY OF THE INVENTION

The device according to the invention 4, has the advantage over the prior art that the protection of a measuring element from solid particles is improved in a simple manner by exerting influence on the movement paths of the solid particles.

It is advantageous to influence the movement paths of the solid particles by means of a protrusion that is broad in the axial direction because this conveys the solid particles past the measuring element by means of intentionally adjusted reflection.

It is also advantageous to influence the movement paths of the solid particles by means of a step so that the solid particles are reflected backward.

It is particularly advantageous to dispose an element for influencing the movement paths of the solid particles in a tubular body because this makes use of a protective action of the tubular body and the element.

BRIEF DESCRIPTION OF THE DRAWINGS

Several exemplary embodiments of the invention are shown in a simplified fashion in the drawings and are explained in detail in the subsequent description, in conjunction with the drawings, in which.

DESCRIPTION OF THE PREFERRED EMBODIMENTS

Figure 1:
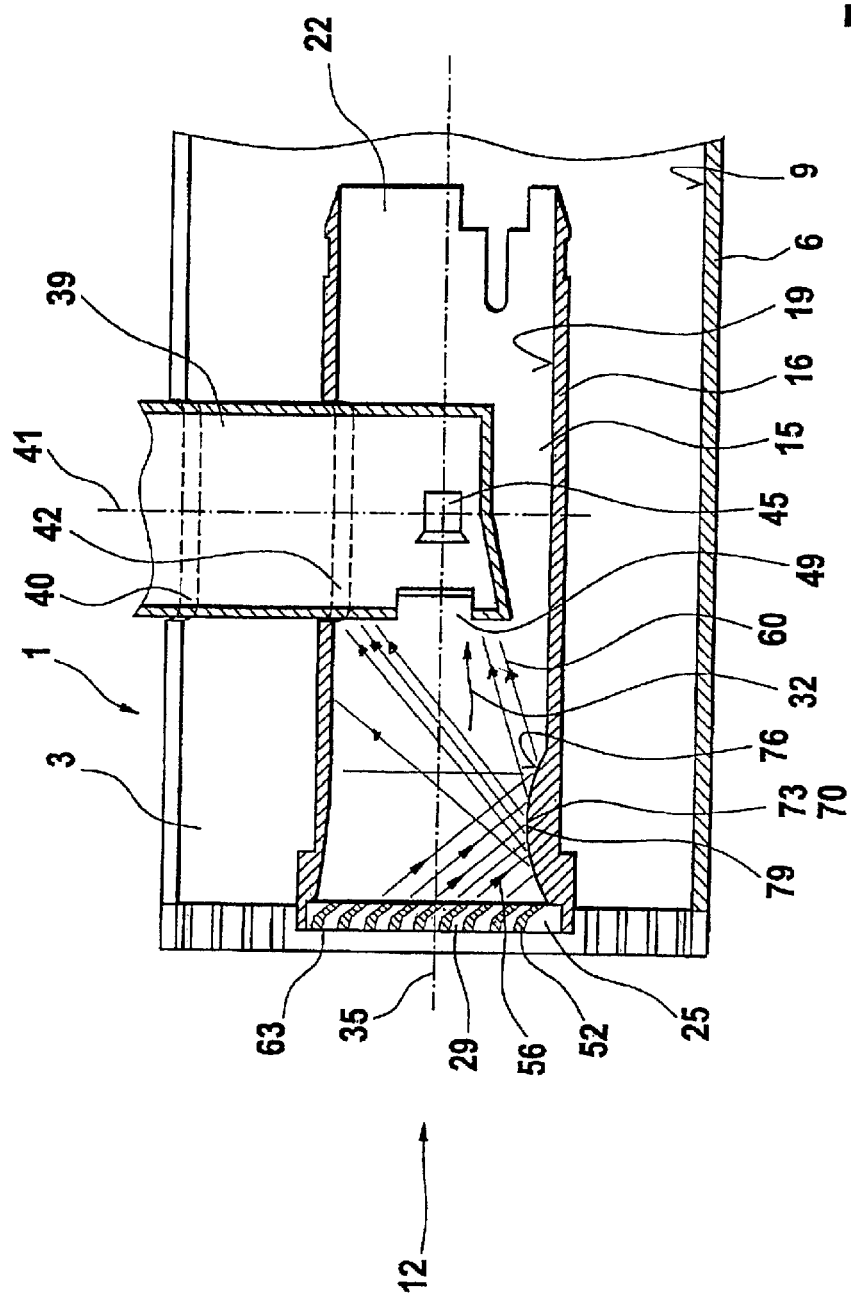
FIG. 1 shows a first exemplary embodiment of a device according to the invention.

FIG. 1 shows a device 1 for determining at least one parameter, in particular an air volume flow, of a medium flowing in a line 3, in particular of the intake air of an internal combustion engine. Parameters of a flowing medium include, for example, the air volume flow for determining an air mass, a temperature, a pressure, a concentration of a component of the medium, or a flow speed, which are determined by means of suitable sensors. It is possible to use the device 1 for determining other parameters. This can take place by virtue of the fact that two or more sensors are used; one sensor can also determine two or more parameters. The line 3 has a wall 6 having an inner surface 9. The medium flows in the line 3 in the main flow direction indicated by the arrow 12. For example, a tubular body 15 is provided in the line and extends spaced radially apart from the line 3; the medium circulates around this tubular body 15. The tubular body 15 has a through flow conduit 22 and a protective screen 25 disposed in the vicinity of its upstream end. Plastic, metal, ceramic, or glass can be used as materials for the protective screen 25. The plate-shaped protective screen 25 made of plastic can be manufactured, for example, by injection molding or by producing screen openings 29 using a material-removing process.

A flow direction 32 prevails in the through flow conduit 22 downstream from the protective screen 25, somewhat removed from it. The flow direction 32 runs approximately parallel to the main flow direction 12. The tubular body 15 has a center line 35, which for example is also the center line of the line 3.

For example, a measuring body 39 extends in the tubular body 15. The measuring body 39 is partially inserted through a first insertion opening 40 in the wall 6 and a second insertion opening 42 in the wall 16 of the tubular body 15 and protrudes into the through flow conduit 22, for example with a free end.

Such a measuring body 39 is known to the specialist from DE 197 35 891 A1, which is incorporated by reference into this disclosure. The air volume aspirated by the internal combustion engine can be changed at will by means of a throttle valve, not shown, which is disposed in the intake tube of the internal combustion engine, downstream of the tubular body 15.

In order to determine the intake air mass of the engine, the measuring body 39 is provided, which is essentially oblong and block-shaped and extends along a longitudinal axis 41. The longitudinal axis 41 extends essentially perpendicular to the center line 35 and therefore also perpendicular to the main flow direction 12.

A plug end of the measuring body 39, which contains electrical connections, e.g. in the form of plug connector tabs, remains outside of the line 3, for example. At least one measuring element 45 is disposed in a known manner in the measuring body 39, in this example a measuring element 45 that contacts the air flowing through the through flow conduit 22. The measuring element 45 can, for example, be a temperature sensor of the kind known from DE 42 28 484 C2, a pressure sensor of the kind used in DE 31 35 794 A1, or an air volume sensor that determines the corresponding parameters.

As an example for the different sensors, an air volume sensor is selected here by way of example, which is used to determine the air volume aspirated by the internal combustion engine.

The measuring element 45 is disposed, for example, in the measuring body 39, which has an inlet opening 49 into which the medium flows.

The measuring element 45 can be embodied in a known manner, for example in the form of at least one temperature-dependent resistor. In particular, it is also possible, as demonstrated in DE 43 38 891 A1 and U.S. Pat. No. 5,452,610, to design the measuring element 45 as a micro-mechanical component that has a dielectric membrane upon which resistor elements are embodied. It is also conceivable to insert the measuring element 45 into the line 3 or into the tubular body 15 without the measuring body 39.

The protective screen 25 has slats 52, which are inclined at a particular deflection angle in relation to the center line 35. The slats 52 constitute screen openings 29 and conduits 63 downstream of the protective screen 25. Fluid droplets adhere to the protective screen 25 and are conveyed by the inclined conduits against the inner wall surface 9 of the line 3 or a wall 16 of the tubular body 15 and then travel past the inlet opening 49 of the measuring body 39 or past the measuring element 45. The gas/solid particle mixture flows through the screen openings 29 deflected in a different direction 56 downstream of the protective screen 25, the new direction 56 being indicated by an arrow.

The movement path of a solid particle is indicated in FIG. 1 by lines 60. The movement paths 60 and the direction 56 of the solid particles extend from each conduit 63 of the protective screen 25 parallel to one another and collide with an inner wall of the tubular body 15 or the line 3. According to the law of reflection, the solid particles are reflected there and subsequently dispersed in a line 3 according to the prior art over an entire cross section of the through flow conduit 22 or the line 3. As a result, the solid particles also travel into the inlet opening 49 of the measuring body 39 and can then collide with the measuring element 45, which can be damaged as a result.

In order to prevent solid particles from traveling into the inlet opening 49, an element 70 is provided upstream of the measuring body 39, in the vicinity of the gas/solid particle mixture flowing in the direction 56, which influences the movement paths 60 of the solid particles. In this exemplary embodiment, the element 70 is disposed, for example, directly downstream of the protective screen 25 and is a protrusion 73 of the wall 16, which is broad in the axial direction, i.e. in direction 32. For example, a contour 76 of the protrusion 73 is a continuously curved surface that is convexly curved in relation to the center line 35. The protrusion 73 has an apex point 79. Solid particles that collide with the protrusion 73 before the apex point 79, in terms of the flow direction, are reflected by a smaller reflection angle and therefore flow past the inlet opening 49. Solid particles that collide with the protrusion 73 downstream of the apex point 79, are reflected by a greater reflection angle, for example past the lower end of the measuring body 39 and also do not travel into the inlet opening 49 of the measuring body 39.

Figure 2:
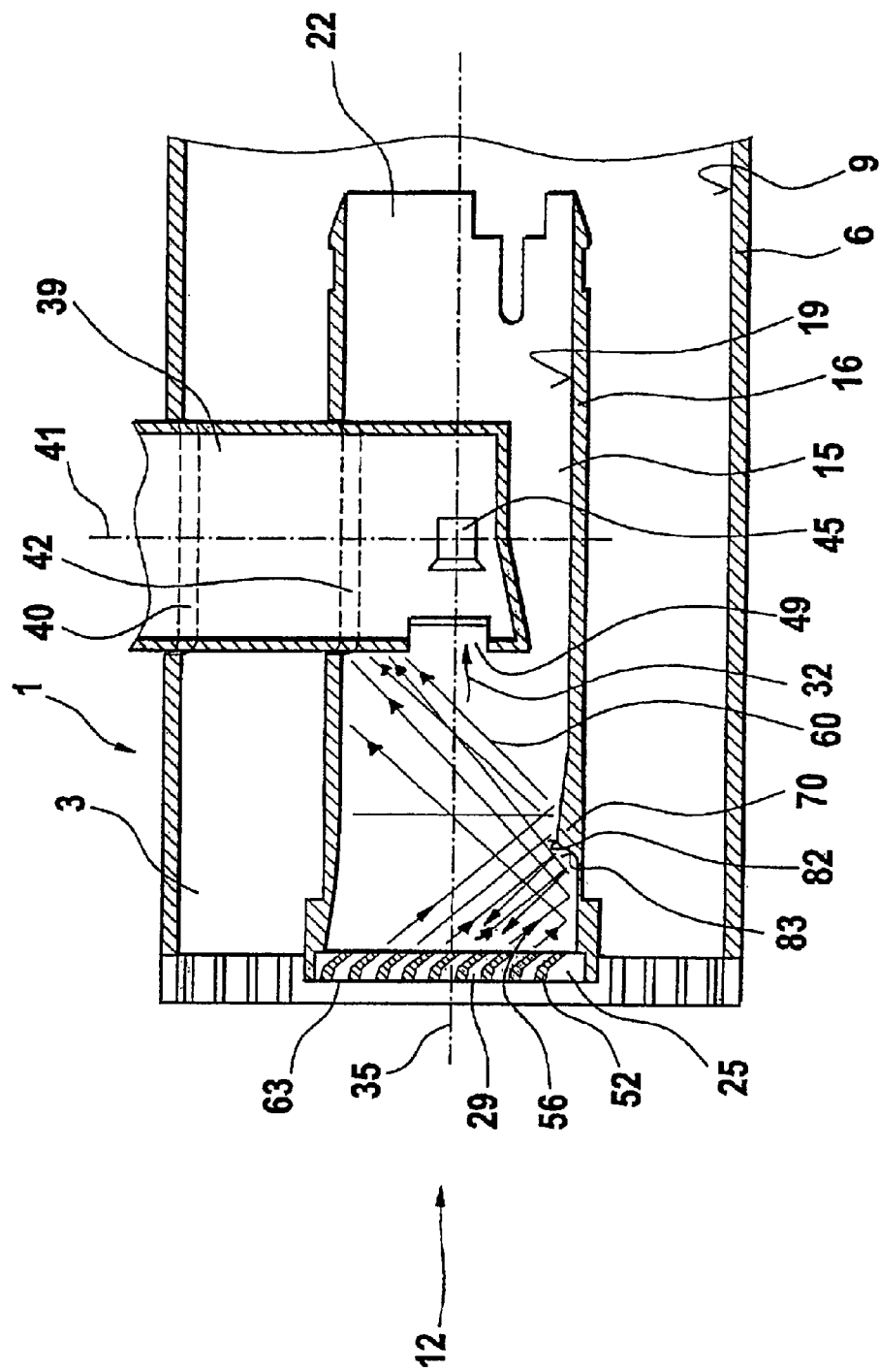
FIGS 2 and 3 show additional exemplary embodiment of the device according to the invention.

FIG. 2 shows another exemplary embodiment of the device 1 embodied according to the invention. Parts that are the same or function in the same manner are provided with the same reference numerals in the following Figs. as they were in the preceding Figs.

In this exemplary embodiment, the element 70, which influences the movement path 60 of the solid particles, has a step 82 directed counter to the flow of the gas/solid particle mixture, with an edge 83 against an inner wall 19 of the tubular body 15. The edge 83 of the step 82 can form any angle with the longitudinal axis 41. The solid particles, which would otherwise be reflected toward the inlet opening 49 by being reflected against a flat inner wall 9, 19, are reflected backward at the edge 83. As a result, the measuring element 45 is protected from solid particles.

Figure 3:
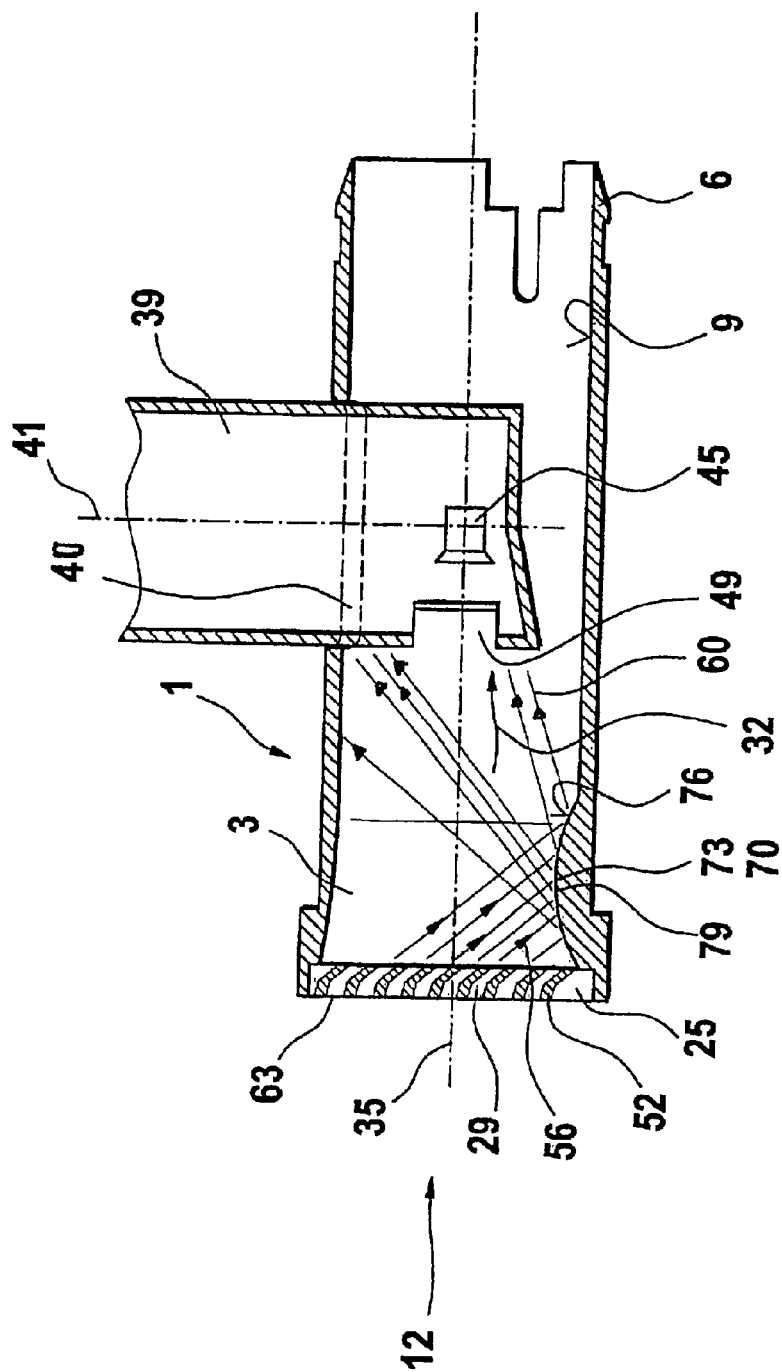

FIG. 3 shows another exemplary embodiment of the device 1 embodied according to the invention. By contrast with FIG. 1, no tubular body 15 is used in this exemplary embodiment. For example, but not necessarily, the protective screen 25 extends over the entire cross section of the line 3. A protrusion 73 provided on the inner wall 19 has been selected as the element 70. However, a step 82 can also be disposed on the inner wall 9 of the line 3.

The foregoing relates to preferred exemplary embodiments of the invention, if being understood that other variants and embodiments thereof are possible within the spirit and scope of the invention, the latter being defined by the appended claims.

What is claimed is:

1. A device (1) for determining at least one parameter, in particular a volume flow, of a medium flowing in a line (3,22), which medium is in the form of a gas/fluid/solid particle mixture, in particular the intake air mixture of an internal combustion engine, the device comprising at least one measuring element (45), which is disposed in the line (3) and which the medium circulates around, at least one protective screen (25), which is disposed at least partially upstream of the measuring element (45) inside the line (3, 22), the protective screen (25) having slats (52), which are inclined at a particular deflection angle in relation to a center line (35) of the line (3, 22), the slats (52) constituting screen openings (29) and conduits (63), which at least partially deflect the medium flowing in a main flow direction (12) downstream of the protective screen (25), and at least one element (70) in the line (3,22) downstream of the protective screen (25) for influencing the movement paths (60) of solid particles differently.

2. The device according to claim 1 wherein, after emerging from the conduits (63), by means of at least a single reflection of the solid particles against the element (70), the movement paths (60) of the solid particles of the flowing medium downstream of the protective screen (25) viewed in the flow direction (12) travel so that the solid particles are directed away from the measuring element (45) disposed further downstream.

3. The device according to claim 2 wherein the element (70) is embodied so that the movement paths (60) of the solid particles of the flowing medium are conveyed past the measuring element (45) by being reflected against the element (70).

4. The device according to claim 3 wherein the element (70) is a protrusion (73) that is broad in the axial direction.

5. The device according to claim 2 wherein the element (70) is a protrusion (73) that is broad in the axial direction.

6. The device according to claim 2 wherein the element (70) has a step (82).

7. The device according to claim 6 wherein the element (70) is designed so that the solid particles of the flowing medium are at least partially reflected backward by the reflection against the element (70).

8. The device according to claim 2 wherein a tubular body (15), which the medium flows through in the main flow direction (12) and has a through flow conduit (22), extends in the line (3) and that the element (70) and the measuring element (45) are disposed in the tubular body (15).

9. The device according to claim 1 wherein the element (70) is embodied so that the movement paths (60) of the solid particles of the flowing medium are conveyed past the measuring element (45) by being reflected against the element (70).

10. The device according to claim 9 wherein the element (70) is a protrusion (73) that is broad in the axial direction.

11. The device according to claim 9 wherein the element (70) has a step (82).

12. The device according to claim 11 wherein the element (70) is designed so that the solid particles of the flowing medium are at least partially reflected backward by the reflection against the element (70).

13. The device according to claim 9 wherein a tubular body (15), which the medium flows through in the main flow direction (12) and has a through flow conduit (22), extends in the line (3) and that the element (70) and the measuring element (45) are disposed in the tubular body (15).

14. The device according to claim 1 wherein the element (70) is a protrusion (73) that is broad in the axial direction.

15. The device according to claim 14 wherein the element (70) has a step (82).

16. The device according to claim 15 wherein the element (70) is designed so that the solid particles of the flowing medium are at least partially reflected backward by the reflection against the element (70).

17. The device according to claim 1 wherein the element (70) has a step (82).

18. The device according to claim 17 wherein the element (70) is designed so that the solid particles of the flowing medium are at least partially reflected backward by the reflection against the element (70).

19. The device according to claim 17 wherein a tubular body (15), which the medium flows through in the main flow direction (12) and has a through flow conduit (22), extends in the line (3) and that the element (70) and the measuring element (45) are disposed in the tubular body (15).

20. The device according to claim 1 wherein a tubular body (15), which the medium flows through in the main flow direction (12) and has a through flow conduit (22), extends in the line (3) and that the element (70) and the measuring element (45) are disposed in the tubular body (15).

* * * * *

UNITED STATES PATENT AND TRADEMARK OFFICE
CERTIFICATE OF CORRECTION

PATENT NO. : 6,840,101 B2
DATED : January 11, 2005
INVENTOR(S) : Erhard Renninger et al.

It is certified that error appears in the above-identified patent and that said Letters Patent is hereby corrected as shown below:

Title page,
Item [56], References Cited, please add the following reference:
-- U.S. PATENT DOCUMENTS
4,433,576      2/1984     Shih et al. --
FOREIGN PATENT DOCUMENTS, please add the following references:
-- DE 197 35 373 C1     11/1998
  DE 197 35 664 A1     02/1998
  WO 01/18499 A1      03/2001
  WO 01/18497 A1      03/2001
  WO 01/19498 A1      03/2001
  JP 2000-304585 A    11/2000 --

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,840,101 B2
DATED : January 11, 2005
INVENTOR(S) : Erhard Renninger et al.

It is certified that error appears in the above-identified patent and that said Letters Patent is hereby corrected as shown below:

<u>Title page,</u>
Item [56], References Cited, please add the following reference:
-- U.S. PATENT DOCUMENTS
4,433,576        2/1984          Shih et al. --.
FOREIGN PATENT DOCUMENTS, please add the following references:
-- DE 197 35 373 C1    11/1998
   DE 197 35 664 A1    02/1999
   WO 01/18499 A1      03/2001
   WO 01/18497 A1      03/2001
   WO 01/19498 A1      03/2001
   JP 2000-304585 A    11/2000 --.

This certificate supersedes Certificate of Correction issued March 22, 2005.

Signed and Sealed this

Twentieth Day of December, 2005

JON W. DUDAS
*Director of the United States Patent and Trademark Office*